United States Patent
Lee et al.

(10) Patent No.: US 9,341,862 B1
(45) Date of Patent: May 17, 2016

(54) EYEGLASSES HAVING NOSE PAD ADJUSTING STRUCTURE

(71) Applicant: TRIMAX SAFETY CORP., Tainan (TW)

(72) Inventors: Shih-I Lee, Tainan (TW); Ching-Hsiu Chan, Tainan (TW)

(73) Assignee: Trimax Safety Corp., Tainan (TW)

( * ) Notice: Subject to any disclaimer, the term of this patent is extended or adjusted under 35 U.S.C. 154(b) by 0 days.

(21) Appl. No.: 14/680,989

(22) Filed: Apr. 7, 2015

(51) Int. Cl.
*G02C 5/12* (2006.01)
*G02C 1/02* (2006.01)

(52) U.S. Cl.
CPC ............... *G02C 5/122* (2013.01); *G02C 1/023* (2013.01)

(58) Field of Classification Search
CPC ............. G02C 5/12; G02C 1/06; G02C 5/122
USPC .......................... 351/137, 138, 136
See application file for complete search history.

(56) References Cited

U.S. PATENT DOCUMENTS

| | | | | |
|---|---|---|---|---|
| 5,291,230 A | * | 3/1994 | Bradley | G02C 5/122 351/128 |
| 5,971,538 A | * | 10/1999 | Heffner | G02C 5/122 345/8 |
| 8,931,894 B1 | * | 1/2015 | Chen | G02C 1/10 351/103 |

* cited by examiner

*Primary Examiner* — Hung Dang
(74) *Attorney, Agent, or Firm* — Che-Yang Chen; Law Offices of Scott Warmuth

(57) ABSTRACT

Eyeglasses having a nose pad adjusting structure is provided, which includes a frame unit, a lens, a nose pad positioning part and a nose pad. The frame unit has a first installation part and a second installation part. The lens is inserted in a first and a second clamping slots of the first and the second installation parts. One end of the nose pad positioning part extends a distance oppositely to the second installation part and then extends curvedly to the second installation part accordingly to form an interval apart from the second installation part. The nose pad positioning part has an internal side wall which a plurality of convex teeth is disposed thereon. Thorn tooth is disposed in a middle portion of the nose pad, and an angle of the nose pad relative to the frame unit is adjusted by engaging the thorn tooth with the convex teeth.

8 Claims, 2 Drawing Sheets

EYEGLASSES HAVING NOSE PAD ADJUSTING STRUCTURE

BACKGROUND OF THE INVENTION

1. Field of the Invention

This application relates to a kind of eyeglasses, and more particularly, to the eyeglasses which the user is able to selectively adjust an angle of a nose pad relative to a frame unit.

2. Description of the Related Art

The conventional eyeglasses are mostly leaned on the user through the temples and the nose pads. So, if the temples and the nose pads are incapable of leaning on the user steadily, the user may feel uncomfortable whenever wearing the eyeglasses. Generally, the nose pad plays a critical role of the comfort in terms of the eyeglasses. Although the traditional nose pad has adjusting structure, the design is too complicated, and has drawbacks in the assembly.

SUMMARY OF THE INVENTION

In view of the aforementioned technical problems, the objective of the present invention provides eyeglasses having a nose pad adjusting structure to improve the existing nose pad which is not able to be adjusted easily by the user according to the actual requirement.

The present invention relates to a kind of eyeglasses having a nose pad adjusting structure which may include a frame unit, a lens, a nose pad positioning part and a nose pad. The frame unit is comprised of a first installation part and a second installation part. Wherein the first installation part may have at least one first clamping slot, one end of the second installation part may be connected to the first installation part, and the second installation part may have at least one second clamping slot. At least one above-mentioned lens may be inserted in the first clamping slot of the first installation part and the second clamping slot of the second installation part of the frame unit. One end of the nose pad positioning part may be mounted on the second installation part; the other end of the nose pad positioning part may extend a distance oppositely to the second installation part and may then extend curvedly toward the second installation part such that an interval may be between the other end of the nose pad positioning part and the second installation part. The nose pad positioning part may have an internal side wall, and a plurality of convex teeth may be disposed on the internal side wall. The nose pad may be assembled on the nose pad positioning part by passing through the interval. Wherein at least one thorn tooth may be disposed in a middle portion of the nose pad and an angle of the nose pad relative to the frame unit may be adjusted by engaging the thorn tooth with the plurality of convex teeth of the internal side wall of the nose pad positioning part.

Preferably, the eyeglasses having a nose pad adjusting structure disclosed in the present invention may further include two temples, wherein the temples may be respectively connected to the frame unit.

Preferably, the nose pad of the eyeglasses having a nose pad adjusting structure disclosed in the present invention may be formed integrally.

Preferably, the nose pad of the eyeglasses having a nose pad adjusting structure disclosed in the present invention may be a reverse U-shaped structure.

Preferably, the second installation part of the eyeglasses having a nose pad adjusting structure disclosed in the present invention may be a reverse Y-shaped structure.

Preferably, a cross section of the nose pad positioning part the eyeglasses having a nose pad adjusting structure disclosed in the present invention may be a C-shaped or a U-shaped structure.

Preferably, the plurality of convex teeth of the internal side wall of the nose pad positioning part of the eyeglasses having a nose pad adjusting structure disclosed in the present invention may be arranged with an equal distance.

Preferably, the interval of the eyeglasses having a nose pad adjusting structure disclosed in the present invention may be located on a top of the nose pad positioning part.

In conclusion, one end of the nose pad positioning part of the eyeglasses having a nose pad adjusting structure disclosed in the present invention may be mounted on the second installation part, and the other end of the nose pad positioning part may extend a distance oppositely to the second installation part and may then extend curvedly to the second installation part to accordingly form an interval apart from the second installation part, such that a C-shaped structure, for example, may be formed. In addition, a plurality of convex teeth may be disposed on the internal side wall of the nose pad positioning part to provide the user for arranging the nose pad having thorn tooth on the nose pad positioning part through the interval to engage the thorn tooth with the plurality of convex teeth, such that an angle of the nose pad relative to the frame unit is able to be adjusted conveniently.

DETAILED DESCRIPTION OF THE PREFERRED EMBODIMENTS

Figure 1:
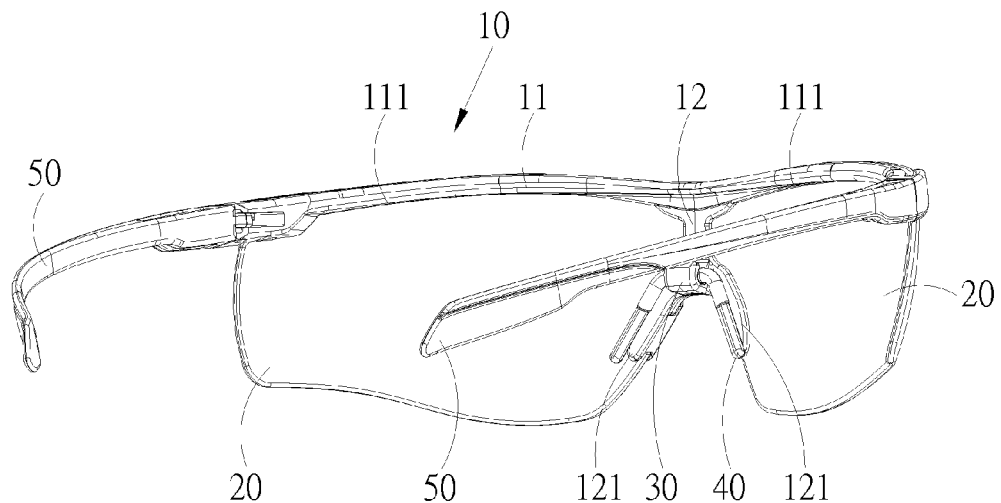
FIG. 1 is a schematic diagram of the eyeglasses having a nose pad adjusting structure of the present invention.
Figure 2:
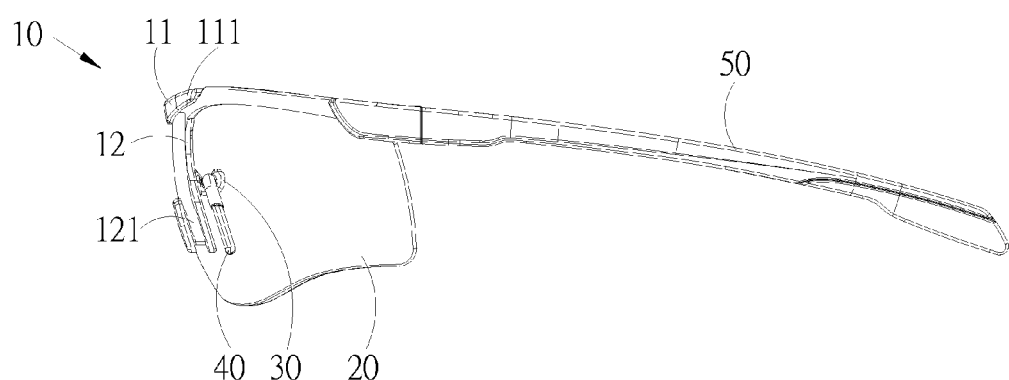
FIG. 2 is a side view of the eyeglasses having a nose pad adjusting structure of the present invention.
Figure 3:
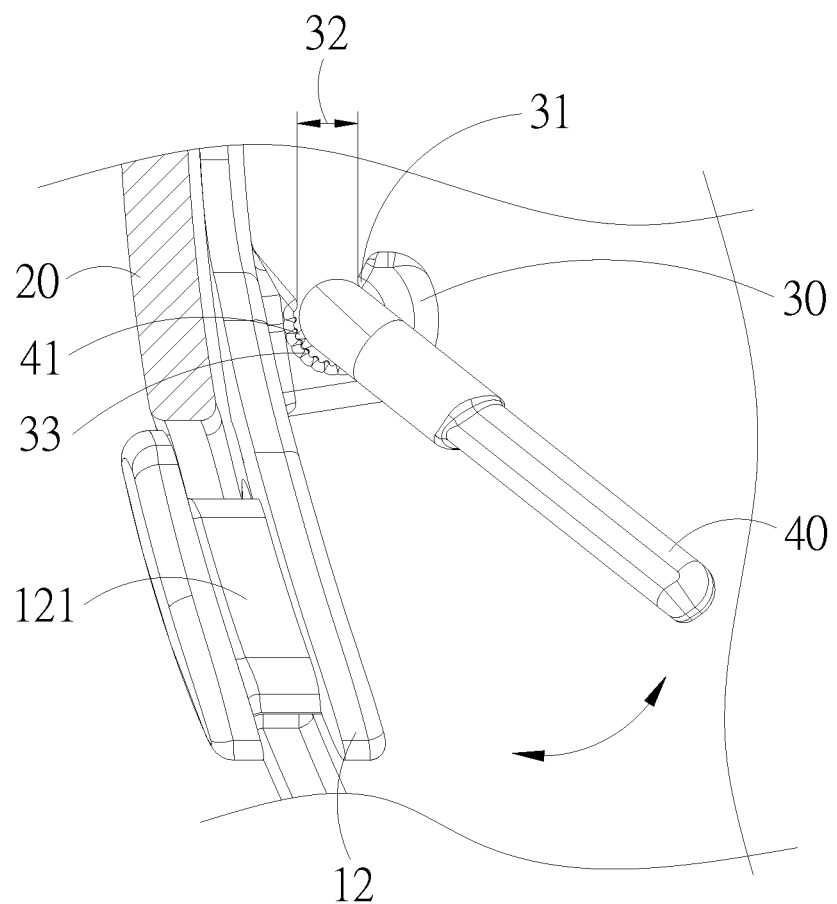
FIG. 3 is a schematic diagram partially showing the nose pad positioning part and the nose pad of the eyeglasses having a nose pad adjusting structure of the present invention.

Please refer to FIG. 1 to FIG. 3. The eyeglasses having a nose pad adjusting structure of the present invention includes a frame unit 10, a lens 20, a nose pad positioning part 30 and a nose pad 40. Wherein, the frame unit 10 is comprised of a first installation part 11 and a second installation part 12. The first installation part 11 has at least one first clamping slot 111. One end of the second installation part 12 is connected to the first installation part 11, and the other end of the second installation part 12 may be an H-shaped structure to form at least one second clamping slot 121. The lens 20 is inserted in the first clamping slot 111 of the first installation part 11 and the second clamping slot 121 of the second installation part 12 of the frame unit 10. Wherein the width of the first clamping slot 111 and the second clamping slot 121 corresponds to the thickness of the frame unit 20. The aforementioned second installation part 12 may be a reverse Y-shaped structure.

Besides, one end of the nose pad positioning part 30 of the present invention is mounted on the second installation part 12, wherein the other end of the nose pad positioning part 30 extends a distance oppositely to the second installation part 12 and then extends curvedly to the second installation part 12 accordingly. An interval 32 is between the other end of the nose pad positioning part 30 and the second installation part 12, wherein the interval 32 is located on a top of the nose pad positioning part 30. The nose pad positioning part 30 has an internal side wall 31, and a plurality of convex teeth 33 which is arranged with equal distance is disposed on the internal side wall 31. The plurality of convex teeth 33 may be distributed on the surface of the internal side wall fully, or partially. The cross section of the nose pad positioning part 30 may be a C-shaped or U-shaped structure (as shown in FIG. 3).

Moreover, the nose pad 40 of the present invention is assembled on the nose pad positioning part 30 through the interval. Wherein at least one thorn tooth 41 is disposed in a middle portion of the nose pad 40 and an angle of the nose pad 40 relative to the frame unit 10 is adjusted by engaging the thorn tooth 41 with the plurality of convex teeth 33 of the internal side wall 31 of the nose pad positioning part 30. Structure of the plurality of convex teeth 33 cooperates with that of the thorn tooth 41. The amount of the aforementioned thorn tooth 41 may be one or more, and two thorn teeth are applied as an example of the present invention. The aforementioned nose pad 40 is formed integrally, and the nose pad is a reverse U-shaped structure. In addition, the eyeglasses having a nose pad adjusting structure of the present invention further includes two temples 50. One end of the temple 50 is connected to the frame unit 10, and the other end of the temple 50 is hung on the user's ear. Moreover, the length of the internal diameter of the nose pad positioning part 30 of the present invention is slightly greater than, or equal to the length of the diameter of the middle of the nose pad 40 plus the length of the thorn tooth 41, such that the angle of the nose pad 40 relative to the frame unit 10 is able to be adjusted steadily.

Please refer to FIG. 2 and FIG. 3. Normally, if uncomfortableness occurs, the user may adjust the angle of the nose pad relative to the frame unit when wearing eyeglasses. The traditional nose pad, however, has to be adjusted depending on the professional technician to prevent the nose pad from being damaged due to inadequate applied force. In contrast, because the second installation part 12 of the frame unit 10 of the eyeglasses having a nose pad adjusting structure of the present invention is assembled with the nose pad positioning part 30, the user is able to arrange the reverse U-shaped nose pad 40 on the nose pad positioning part 30 through the interval 32 and engage the plurality of convex teeth 33 of the nose pad positioning part 30 with the thorn tooth 41 of the nose pad 40, such that the angle of the nose pad 40 relative to the frame unit 10 can be adjusted left or right easily by the user (the arrow shown in FIG. 3). Hence, the technical problem of the complicated adjustment of the conventional nose pad is thereby improved.

In conclusion, the eyeglasses having a nose pad adjusting structure of the present invention applies the engagement of convex teeth of the nose pad positioning part and the thorn tooth of the nose pad to enable the user adjusting the angle of the nose pad relative to the frame unit. For example, the user is capable of adjusting the nose pad approaching to, or away from the frame unit according to the actual requirement.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An eyeglasses having a nose pad adjusting structure, comprising:
   a frame unit comprised of a first installation part and a second installation part, wherein the first installation part has at least one first clamping slot, one end of the second installation part is connected to the first installation part, and the second installation part has at least one second clamping slot;
   at least one lens inserted in the first clamping slot of the first installation part and the second clamping slot of the second installation part of the frame unit;
   a nose pad positioning part, one end of the nose pad positioning part mounted on the second installation part, wherein, the other end of the nose pad positioning part extends a distance oppositely to the second installation part and then extends curvedly to the second installation part such that an interval is between the other end of the nose pad positioning part and the second installation part; the nose pad positioning part has an internal side wall, and a plurality of convex teeth is disposed on the internal side wall, and
   a nose pad assembled on the nose pad positioning part through the interval, wherein at least one thorn tooth is disposed in a middle portion of the nose pad, and an angle of the nose pad relative to the frame unit is adjusted by engaging the thorn tooth with the plurality of convex teeth of the internal side wall of the nose pad positioning part.

2. The eyeglasses having a nose pad adjusting structure of claim 1, further comprising two temples, wherein the temples are respectively connected to the frame unit.

3. The eyeglasses having a nose pad adjusting structure of claim 1, wherein the nose pad is formed integrally.

4. The eyeglasses having a nose pad adjusting structure of claim 3, wherein the nose pad is a reverse U-shaped structure.

5. The eyeglasses having a nose pad adjusting structure of claim 1, wherein the second installation part is a reverse Y-shaped structure.

6. The eyeglasses having a nose pad adjusting structure of claim 1, wherein a cross section of the nose pad positioning part is a C-shaped or a U-shaped structure.

7. The eyeglasses having a nose pad adjusting structure of claim 1, wherein the plurality of convex teeth of the internal side wall of the nose pad positioning part is arranged with an equal distance.

8. The eyeglasses having a nose pad adjusting structure of claim 1, wherein the interval is located on a top of the nose pad positioning part.

* * * * *